(12) United States Patent
Bjelland et al.

(10) Patent No.: US 6,973,054 B2
(45) Date of Patent: Dec. 6, 2005

(54) COMMUNICATION MANAGEMENT IN MOBILE NETWORKS HAVING SPLIT CONTROL PLANES AND USER PLANES

(75) Inventors: Frode Bjelland, Arendal (NO); Stephen Terrill, Stockholm (SE); Juan-Antonio Ibanez, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 808 days.

(21) Appl. No.: 09/996,512

(22) Filed: Nov. 28, 2001

(65) Prior Publication Data

US 2002/0089949 A1 Jul. 11, 2002

Related U.S. Application Data

(63) Continuation-in-part of application No. 09/903,366, filed on Jul. 11, 2001.

(60) Provisional application No. 60/259,710, filed on Jan. 5, 2001.

(51) Int. Cl.[7] .............................................. H04B 7/00
(52) U.S. Cl. ..................... 370/310; 370/252; 370/331; 455/422.1; 455/436; 455/442; 455/453
(58) Field of Search ............................... 370/252, 310, 370/328, 329, 332, 333, 341, 331; 455/421, 455/436, 437, 438, 439, 440, 442, 450, 453, 455/464, 422.1

(56) References Cited

U.S. PATENT DOCUMENTS

| | | | |
|---|---|---|---|
| 5,550,827 A | 8/1996 | Fernström | 370/392 |
| 5,884,179 A | 3/1999 | Patel | 445/445 |
| 5,953,328 A | 9/1999 | Kim et al. | 370/337 |
| 6,192,232 B1 * | 2/2001 | Iseyama | 455/404.1 |
| 6,195,760 B1 | 2/2001 | Chung et al. | 714/4 |
| 6,438,370 B1 * | 8/2002 | Einola et al. | 455/422.1 |
| 6,466,556 B1 * | 10/2002 | Boudreaux | 370/331 |
| 6,640,105 B1 * | 10/2003 | Shin | 455/453 |

FOREIGN PATENT DOCUMENTS

| | | | | |
|---|---|---|---|---|
| EP | 939 516 | 9/1999 | | H04L 12/26 |
| JP | 2000059397 | 2/2000 | | H04Q 3/00 |
| WO | 9726739 A1 | 7/1997 | | H04L 12/56 |

(Continued)

OTHER PUBLICATIONS

U.S. Appl. No. 09/903,364, filed Jul. 11, 2001, Bjelland et al.

(Continued)

*Primary Examiner*—Dang Ton
*Assistant Examiner*—Shick Hom
(74) *Attorney, Agent, or Firm*—Roger Burleigh

(57) ABSTRACT

A method in a communication system of transferring control of a user-plane entity from a first control-plane entity to a second control-plane entity is provided. The user-plane entity sends a set of identifying parameters to the first control-plane entity, which subsequently sends the set of identifying parameters to the second control-plane entity. The second control-plane entity determines if it can control the user-plane entity. If the second control-plane entity can control the user-plane entity, then the second control-plane entity sends an indication to the user-plane entity that a change in control-plane entities has occurred and that at least some resources of the user-plane entity that were controlled by the first control-plane entity are to be controlled by the second control-plane entity. The resources may be allocated to a mobile terminal and the change in control entity may be the result of a change in location of the mobile terminal.

7 Claims, 5 Drawing Sheets

FOREIGN PATENT DOCUMENTS

| WO | 9827691 A1 | 6/1998 | ........... H04L 12/28 |
| --- | --- | --- | --- |
| WO | 9900946 A2 | 1/1999 | ........... H04L 12/56 |
| WO | 9929065 A2 | 6/1999 | ........... H04L 12/14 |
| WO | 9934635 A3 | 7/1999 | ........... H04Q 7/38 |
| WO | 9956478 A1 | 11/1999 | ........... H04Q 7/22 |
| WO | 9963774 A1 | 12/1999 | ........... H04Q 7/22 |
| WO | 200001173 A1 | 1/2000 | ........... H04Q 7/22 |
| WO | 200010357 A1 | 2/2000 | ........... H04Q 7/38 |
| WO | 200016579 A1 | 3/2000 | ........... H04Q 7/38 |

OTHER PUBLICATIONS

U.S. Appl. No. 09/903,365, filed Jul. 11, 2001, Bjelland et al.

Granbohm, Håkan and Joakim Wiklund, "GPRS—General packet radio service", pp. 82-88, Ericsson Review No. 2, 1999, Sweden.

Ekeroth, Lars and Per-Martin Hedström, "GPRS support nodes", pp. 156-169, Ericsson Review No. 3, 2000, Sweden.

"3rd Generation Partnership Project (3GPP); Technical Specification Group Services and System Aspects; Feasibility Study for Transport and Control Separation in the PS CN Domain" TR23.873v1.1.0, 3GPP TSG SA2 Meeting #15, pp. 1-99, Jan. 22nd-26th, 2001, Los Angeles, California.

"3rd Generation Partnership Project; Technical Specification Group Services and System Aspects; GSM call and event data for the packet switched domain" 3G TS 32.015 version 3.0.0, pp. 1-59, 1999, France.

"Draft Recommendation H.248 with changes against white paper", ITU—Telecommunication Standardization Sector TD-XX, Study Group 16, pp. 1-136, Jun. 15, 2000, Geneva, Switzerland.

"3rd Generation Partnership Project; Technical Specification Group Services and System Aspects; General Packet Radio Service (GPRS); Service description; Stage 2", 3G TS 23.060 V3.3.0 (Apr. 2000) pp. 1-190, Release 2000, France.

Greene et al., "Media Gateway Control Protocol Architecture and Requirements", RFC 2805, IETF (Apr. 2000).

Greene et al., "Megaco Protocol version 0.8", RFC 2885, IETF (Aug. 2000).

T. Taylor, "Megaco Errata", RFC 2886, IETF (Aug. 2000).

"Third Generation Partnership Project; Technical Specification Group Services and System Aspects; Digital Cellular Telecommunications System (Phase 2 + ) (GSM); General Packet Radio Service (GPRS); Service description; Stage 2", 3GPP TS 03.60 Version 7.6.0 (Release 1998).

* cited by examiner

COMMUNICATION MANAGEMENT IN MOBILE NETWORKS HAVING SPLIT CONTROL PLANES AND USER PLANES

BACKGROUND

This application is a continuation-in-part of U.S. patent application Ser. No. 09/903,366 that was filed on Jul. 11, 2001, and claims the benefit of the priority of that application. This application also claims the benefit of the priority of U.S. Provisional Patent Application No. 60/259,710 that was filed on Jan. 5, 2001, and that is incorporated here by reference.

This invention relates to methods and apparatus for telecommunication and in particular to use of Media Gateway Control protocol mechanisms in a packet-switched communication system having a split control-plane/user-plane architecture to enable the selection of the same Media Gateway and the same call or session within the Media Gateway when changing from one Media Controller to another Media Controller.

In a packet data communication system, information is exchanged as packets of digital data, or datagrams. Each data packet includes address information that enables the system to direct each packet on its own way through the system from a sender to a receiver. Thus, a packet data communication system does not maintain a continuous connection between a sender and a receiver. Packet data communication systems are sometimes called "connectionless" and packet-switched systems, distinguishing them from traditional telephony systems in which continuous connections are established between senders and receivers. Thus, traditional telephony systems are sometimes called "connection-oriented" and circuit-switched systems.

General packet radio service (GPRS) is a packet-switched communication system that is standardized by the European Telecommunications Standards Institute (ETSI) and the Third Generation Partnership Project (3GPP). See for example "Digital Cellular Telecommunications System (Phase 2+) (GSM); General Packet Radio Service (GPRS); Service description; Stage 2", 3GPP TS 03.60 ver. 7.6.0 Release 1998; and "General Packet Radio Service (GPRS); Service Description; Stage 2", 3GPP TS 23.060 ver. 3.3.0 Release 1999 (April 2000). GPRS is also described in H. Granbohm et al., "GPRS—General Packet Radio Service", *Ericsson Review* No. 2, pp. 82–88 (1999) and in L. Ekeroth et al., "GPRS Support Nodes", *Ericsson Review* No. 3, pp. 156–169 (2000).

GPRS operates with circuit-switched, cellular mobile telephone systems such as the Global System for Mobile (GSM) system, also standardized by ETSI and 3GPP, and the U.S. time division multiple access (TDMA) cellular system defined by the TIA/EIA-136 standard promulgated by the Telecommunications Industry Association (TIA) and Electronic Industries Association (EIA). By adding GPRS functionality to GSM and TDMA public land mobile networks (PLMNs), network operators can give their subscribers resource-efficient access to external Internet protocol-based (IP-based) networks like the Internet.

As depicted in FIG. 1, a GSM-style PLMN includes a number of interconnected network nodes, in particular, a mobile switching center/visitor location register (MSC/VLR), a home location register (HLR), and base station subsystems (BSS). The BSS handles radio communication with subscribers' mobile stations (MSs) via an air interface Um. The HLR is a database of information about the subscribers that is accessed by the MSC/VLR via a D-interface and that is accessed by a serving GPRS support node (SGSN) via a Gr-interface. The MSC/VLR routes circuit-switched calls to and from the MSs, communicating with the BSS over an A-interface. It will be appreciated that these nodes are typical of a circuit-switched network such as a PLMN, whether GSM or not. Data transfer and signaling interfaces are indicated in FIG. 1 by solid lines and signaling interfaces are indicated by dashed lines.

Packet data services and GPRS add nodes in a packet-switched portion of the communication network for handling packet data traffic; these nodes interwork with the circuit-switched portion of the communication system depicted in FIG. 1. For example, an SGSN is connected to the BSS via a Gb-interface and resides at the same hierarchical level in the network as the MSC/VLR. A gateway GPRS support node (GGSN) is the interconnection point to a packet data network (PDN) via a Gi-interface and is connected to the SGSN via a Gn-interface (which may be an IP backbone). User data to the Internet, directed for example, from a terminal equipment (TE) connected to a mobile terminal (MT), is sent encapsulated over the IP backbone. In FIG. 1, R is a reference point between a non-ISDN compatible TE and an MT. In this application, the end-user's equipment is called a mobile station (MS) whether it is a combination of a phone (MT) and a device such as a computer (TE) or just a phone.

The SGSN and GGSN can be combined into one physical node and deployed at a central point in the network, or a network may include several GGSNs and SGSNs as shown. Packet data streams and short text messages are handled in FIG. 1 by a Short Message Service—Gateway MSC (SMS-GMSC) and an SMS—Interworking MSC (SMS-IWMSC) that communicate with the HLR via a C-interface and with the MSC/VLR via an E-interface. As seen in FIG. 1, the SMS-GMSC and SMS-IWMSC exchange short messages with a short message switching center (SM-SC), and the SMS-GMSC communicates with the SGSN via a Gd-interface. It will be appreciated that the nodes depicted in FIG. 1 are typical of a packet-switched network, whether a GPRS network or not.

Most of the interfaces depicted in FIG. 1, and in particular the Gs- and A-interfaces, exchange messages with the help of the Signaling System Number 7 (SS7) that is standardized by ETSI and the American National Standards Institute (ANSI), among others. SS7 in GSM and GPRS uses a message transfer part (MTP) protocol to deliver messages and a signaling connection control part (SCCP) protocol for extended addressing. The SCCP protocol provides for each message to have an SCCP header that has a sub-system number for telling the node receiving the message which application should have the message. An SGSN, for example, typically has different sub-system numbers for communication with the HLR and with the MSC/VLR. An MSC usually derives the node type of a communicating peer node based on the sub-system number that may be stored in a database or included in an earlier message.

In a GPRS network, packet data channels (PDCHs) are mapped onto respective timeslots, thereby utilizing the same physical channel structure as ordinary circuit-switched GSM/TDMA channels. All radio resources are managed from a base station controller (BSC), or radio network controller (RNC), in the BSS, which also includes Base Transceiver Stations (BTSs); the pool of physical channels for a given cell can be used as either circuit-switched channels or packet-data channels. By packet multiplexing, the allocated PDCHs can be shared by every GPRS user in the cell, and the number of PDCHs in a cell can be fixed or dynamically allocated to meet fluctuating traffic demands. To support efficient multiplexing of packet traffic to and from mobile stations, or mobile terminals (MTs), packet data traffic channels (PDTCHs), packet associated control channels (PACCHs), and packet data common control channels (PDCCHs) are specified for the air interface Um, although PDCCHs are not always used.

As noted above, an SGSN serves every GPRS subscriber that is physically located within the SGSN's service area. To a large extent, the SGSN does for the packet data service what the MSC/VLR does for circuit-switched service. The mobility management functions for GPRS terminals that are performed by an SGSN include attach/detach, user authentication, ciphering, location management, and so on, and an SGSN supports combined mobility management for at least some mobile terminals by interworking with the MSC/VLR. An SGSN also manages the logical link to mobile terminals that carries user packet traffic, SMS traffic, and layer-3 signaling between the network and the GPRS terminals. An SGSN also routes and transfers packets between mobile terminals and the GGSN; handles packet data protocol (PDP) contexts (the PDP context defines important parameters, such as the access point name, quality of service, the GGSN to be used, and so on, for connection to the external packet data network); interworks with the radio resource management in the BSS; and generates charging data.

As noted above, the GGSN accommodates the interface to external IP-based networks. Access-server functionality in the GGSN is defined according to standards from the Internet Engineering Task Force (IETF). The GGSN functions as a border gateway between the PLMN and external networks, sets up communication with external packet data networks, authenticates users to external packet networks, routes and tunnels packets to and from the SGSN, and generates charging data.

The MSC/VLR also supports integrated mobility management for mobile terminals. GPRS attach and PDP-context activation must be executed in order for GPRS users to connect to external packet data networks. The mobile terminal makes itself known to the network by means of GPRS attach, which corresponds to IMSI attach used for circuit-switched traffic. Once the terminal is attached to the network, the network knows its location and capabilities. For some mobile terminals, circuit-switched IMSI attach and packet-switched GPRS attach can be performed at the same time.

GPRS attach is depicted by FIG. 2. In step 1, the mobile terminal requests that it be attached to the network. The terminal's request, which is sent to the SGSN, includes parameters that indicate its multi-timeslot capabilities, the ciphering algorithms it supports, whether it wants to attach to a packet-switched service or to both packet- and circuit-switched services, etc. In step 2, authentication is made between the terminal and SGSN, which may fetch relevant data from the HLR. In step 3, subscriber data from the HLR is inserted into the SGSN; and in step 4, information is passed to the terminal that indicates the terminal is attached to the network.

Before the mobile terminal can communicate with an external PDN (e.g., an IP network), a PDP context must be activated. The PDP context includes parameters that describe the characteristics of the connection to the external PDN, e.g., the address allocated to the MS, access point name (APN), QoS, and so on. PDP contexts may be primary or secondary, in which a secondary PDP context uses the same MS IP address and is connected towards the same APN (i.e., external net) as its respective primary PDP context. A composite PDP context contains one primary and zero or more secondary PDP contexts.

PDP-context activation is depicted in FIG. 3. In step 1, the mobile terminal requests PDP-context activation. In step 2, the SGSN validates the request based on subscription information received from the HLR during GPRS attach. In step 3, the APN is sent to a domain name server (DNS) from the SGSN to find the IP address of the relevant GGSN. In step 4, a logical connection is created between the SGSN and the GGSN (i.e., a GPRS Tunneling Protocol (GTP) tunnel is formed). In step 5, the GGSN assigns a dynamic IP address to the mobile terminal, if required, from the range of IP addresses allocated to the PLMN or externally, from a Remote Authentication Dial-In User Service (RADIUS) server (a fixed IP address from the HLR could also be used). A RADIUS client is included in the GGSN to support Password Authentication Protocol (PAP) and Challenge Handshake Authentication Protocol (CHAP) authentication messages from the MSs, extracting the required information from these messages, and passing this information via the RADIUS protocol to external networks with RADIUS servers. After an acknowledgment of the PDP context activation is returned to the MS (step 6), communication between the user and the external PDN (e.g., an Internet Service Provider (ISP) network or a corporate network) can commence (step 7).

Many network operators see an advantage in physically splitting node(s) in a network like that depicted in FIG. 1 into control plane node(s) and user plane node(s), thus better enabling independent scalability of signaling traffic and data traffic. In particular, the number of end-users is scalable independently of the end-user traffic. By connecting each user-plane node to several control-plane nodes and vice versa, it is possible to use the total network capacity more efficiently. Moreover, it is possible to dispose common user-plane nodes between the circuit-switched and the packet-switched portions of the communication network to reduce the necessary network resources even further and to provide a better migration path when circuit-switched equipment is replaced by packet-switched equipment. Also, this enables cheaper replacement of the network nodes handling user-plane traffic as technology evolves.

The Universal Mobile Telecommunication System (UMTS) is a combined circuit-switched and packet-switched communication system. The circuit-switched portion has a split control-plane/user-plane architecture, and therefore physically splitting nodes in the circuit-switched portion of this system is already possible. The packet-switched portion does not have a split architecture, although a logical split already exists in the current specifications of the packet-switched portion and thus it may be just a matter of time before a split architecture is defined.

When a split architecture is implemented, a protocol for communications between control- and user-plane entities must be defined. Two such protocols are the H.248 and Media Gateway Control (MEGACO) protocols, which are similar enough that they will be called the H.248/MEGACO protocol in this application. The H.248/MEGACO protocol defines, in an open and flexible way, a generic framework for information exchange between control-plane and user-plane entities as well as application-specific packages that can be tailored to the different needs of an application like GPRS. The H.248 protocol is being developed by Study Group 16 of the International Telecommunications Union (ITU) (see Draft Recommendation H.248, ITU (Jun. 15, 2000), which is incorporated here by reference). The MEGACO protocol is being developed in the IETF's MEGACO working group (see N. Greene et al., "Megaco Protocol version 0.8", RFC 2885, IETF (August 2000) and T. Taylor, "Megaco Errata", RFC 2886, IETF (August 2000), which are the successors to N. Greene et al., "Media Gateway Control Protocol Architecture and Requirements", RFC 2805, IETF (April 1999)).

In these standardization protocols, the call/application function located in the control plane is called a Media Controller (MC) and the bearer/resource function located in the user plane is called a Media Gateway (MG). An MG normally converts media provided in one type of network to a format required in another type of network, and controls the parts of a call state that pertain to connection control for media channels in an MG. For example, an MG may terminate bearer channels from a circuit-switched network (e.g., DS0 channels in a PSTN) and media streams from a packet-switched network (e.g., real-time transport protocol (RTP) streams in an IP network).

FIG. 4 depicts such a network that has two nodes and a split architecture. The nodes 402, 404 include respective MCs 406, 408 and respective MGs 410, 412. Communications on the interface between the media controllers, i.e., the control-plane entities, are conducted according to a call/application control protocol. Communications on the interface between the media gateways, i.e., the user-plane entities, are conducted according to a bearer/resource protocol. Communications on the interface between the control-plane and user-plane entities can be conducted according to the H.248/MEGACO protocol.

The H.248/MEGACO protocol is also organized according to user-plane concepts of Contexts, Terminations, Streams, and Descriptors, which can be better understood with the help of FIG. 5.

Contexts and Terminations relate to resources in the user plane. A Termination represents a physical or logical endpoint of flows of information, or media, and encapsulates media stream parameters as well as modem and bearer parameters. A Termination may include zero or more Streams and is identified by a TerminationID. Two Terminations are shown in FIG. 5. A Context logically groups one or more Terminations and is identified by a ContextID. A Context describes the topology (who hears/sees whom, i.e., the flow of media among Terminations) and the media mixing and/or switching parameters if more than two Terminations are involved in the Context. One Context that groups two Terminations is shown in FIG. 5. Each user plane entity (i.e., a media gateway in a split architecture like that shown in FIG. 4) can contain, or handle, several Contexts from several MSs. In general, Terminations are added/removed from Contexts by Add and Subtract commands.

Terminations have properties that have unique PropertyIDs, and related properties are grouped into Descriptors, which may be input or output parameters of commands. For example, a Stream describes a flow of media through a Termination in an MG. A Stream may include a received and/or a sent media flow, and is identified by a StreamID. Four bi-directional Streams are depicted in FIG. 5. The Streams 502, 504 are interconnected in the Context and hence they have the same StreamID. Similarly, the Streams 506, 508 are interconnected in the Context and hence they too have the same StreamID. Several Streams can be set up in one Termination, and FIG. 5 shows each Termination having two Streams. User data received by a media gateway is described by a Local Descriptor and user data sent by a media gateway is described by a Remote Descriptor.

The H.248/MEGACO protocol defines an Events Descriptor that describes events, conditions, parameters, etc. to be detected by an MG and what to do when such events are detected. The Events Descriptor typically contains a RequestID and a list of events that the MG is requested to detect and report. The RequestID is used to correlate the request with the notifications that it may trigger. Each event in the Descriptor typically contains an Event name, an optional StreamID, and other optional parameters. When an event is processed against the contents of an active Events Descriptor and found to be present ("recognized") in that Descriptor, the MG typically sends a Notify command to the MC. For example, conditions that might be monitored are the transferred information volume (e.g., the number of sent/received octets/packets) and the time duration of a communication session, which can be used as bases for charging a subscriber for the service provided.

The H.248/MEGACO protocol provides another Descriptor called a SignalsDescriptor, which is a parameter that contains a set of Signals that an MG applies to a Termination. There are three types of Signals: on/off, which is a Signal that lasts until it is turned off; timeout, which is a Signal that lasts until it is turned off or a specified time period elapses; and brief, which is a Signal having such a short duration that it will stop on its own unless a new Signal is applied that causes it to stop. Production of a Signal on a Termination is stopped by detection of an Event on the Termination, among other things. Signals are identified by SignalIDs and optionally by relevant StreamID, signal type, and duration, among others. A Media Controller can send a Signal to a Media Gateway to order the Media Gateway to perform an action, like send a message to its peer (in the user plane).

In GPRS, establishing a PDP context implies establishing a communication session in an MS, the radio network, an SGSN, and a GGSN. Given the mobility of MSs, it is likely that an MS may move from the service area of a first SGSN into the service area of a second SGSN. As the MS moves out of the service area, the first SGSN would seek to free the resources used in the MG and elsewhere for handling the call or session of the MS. Likewise, the second SGSN would seek to establish a call or session to service the MS. In a split architecture, however, the first and second SGSNs may share the same MG, and the call or session of the MS may be unnecessarily interrupted. Thus, it would be helpful to keep the same MG and the same call or session resources within the MG when there is a change of an MC, thereby minimizing the interruption of service to the MS. For example in networks in which several MCs are arranged in a pool that covers a given geographical area, it is useful to keep the same MG but change MCs when an MC having an established call or session must be taken out of service for maintenance work like a software change or for some other reason.

In view of the effort being expended to develop the H.248/MEGACO protocol, it could be beneficial to use that protocol in a wide variety of communication environments, including GPRS for example. Aspects of this effort are described in "Feasibility Study for Transport and Control Separation in the PS CN Domain", 3GPP TR 23.873 ver. 1.1.0 (January 2001), which is incorporated here by reference. Further aspects are described in U.S. patent application Ser. No. 09/903,364 and Ser. No. 09/903,365, both filed on Jul. 11, 2001, by F. Bjelland et al. Nevertheless, how the H.248/MEGACO protocol might be used in a packet-switched network like GPRS/UMTS or GPRS/TDMA has not been defined. One contributor to this problem may be that the split architecture is not yet standardized for GPRS.

SUMMARY

In accordance with one aspect of Applicants' invention, a method in a communication system of transferring control of a user-plane entity from a first control-plane entity to a second control-plane entity is provided. The user-plane entity sends a set of identifying parameters to the first control-plane entity, which then sends the set of identifying parameters to the second control-plane entity. The second control-plane entity determines if it can control the user-plane entity. If the second control-plane entity can control the user-plane entity, then the second control-plane entity sends an indication to the user-plane entity that a change in control-plane entities has occurred and that at least some resources of the user-plane entity that were controlled by the first control-plane entity are to be controlled by the second control-plane entity.

The initial step of sending, by the user-plane entity to the first control-plane entity, a set of identifying parameters may be executed in response to receiving, by the user-plane entity, an indication that a change in control-plane entities is required. The indication that a change in control-plane entities is required may be sent based on the location of a remote terminal or on the status of the first control-plane entity (e.g., to be taken out of service due to a software upgrade, for example). As an alternative, the set of identifying parameters may be sent from the MG to the first control-plane entity in response to setting up the call or session in the MG when the first control-plane entity orders the setup.

In accordance with another aspect of the invention, the communication system is a GPRS network and the set of identifying parameters is sent in a Forward Relocation Request message from the first control-plane entity to the second control-plane entity.

BRIEF DESCRIPTION OF THE DRAWINGS

The features, objects, and advantages of this invention will be apparent from reading this description in conjunction with the drawings, in which.

DETAILED DESCRIPTION

This description is given in terms of GPRS for convenience only, and it will be appreciated that the principles of the invention can be applied in other packet-switched networks having suitable characteristics. For example, this invention can be implemented in an MSC in a traditionally circuit-switched part of a network that has been updated to use packet bearers such as IP packets.

As described above, GPRS is organized according to mobility management (MM) contexts, PDP contexts, and GTP tunnels, and the SGSN is the GPRS support node (GSN) that is currently believed to benefit most from a split architecture.

A Media Controller (SGSN control plane) typically receives a set of parameters that identifies a call or session in a Media Gateway (SGSN user plane) in the response from the MG when the MC orders the call or session to be set up in the MG. As an alternative, the MC can receive the set of parameters from the MG by the MC's auditing the MG when the MC is informed that a change in MC is imminent.

Figure 6:
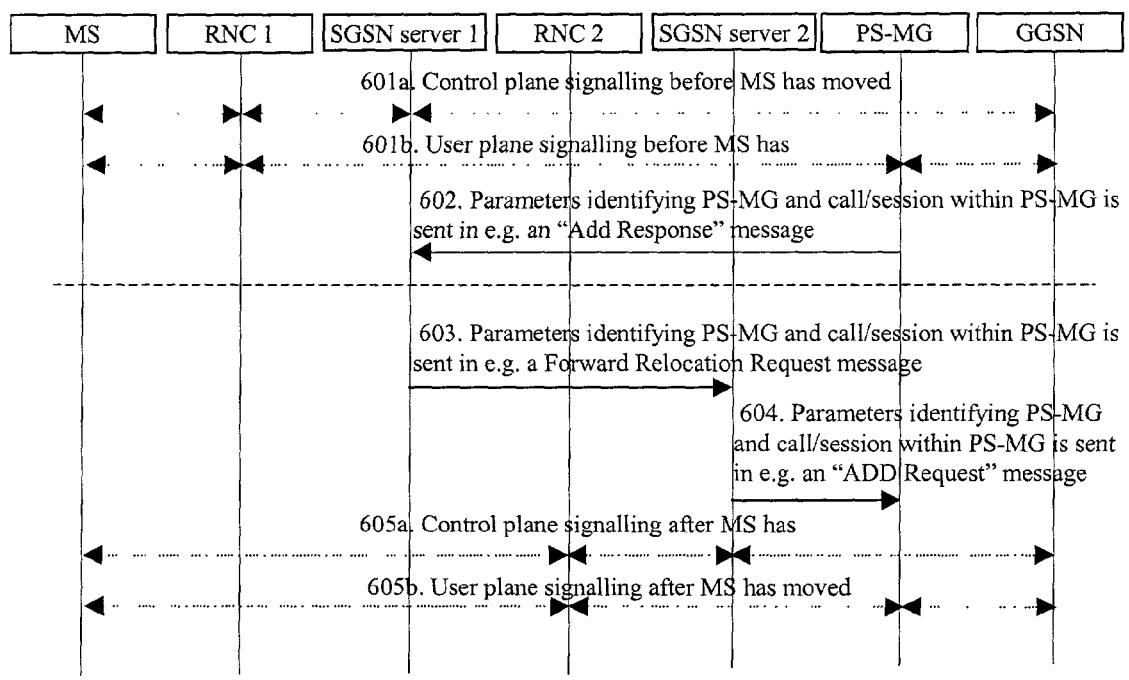
FIG. 6 is a signaling sequence diagram.

FIG. 6 is a diagram of a signaling sequence in accordance with an aspect of the invention. Signal path 601a indicates the normal control-plane signaling flow between the MS and the GGSN, and signal path 601b indicates the normal user-plane signaling flow between the MS and the GGSN. Typically, the MS communicates with a first RNC RNC1 through a Node B (not shown). The controller RNC1 receives user-plane messages and control-plane messages from the MS. The control-plane messages are sent from the controller RNC1 to a first SGSN server (SGSN server 1), and the user-plane messages are sent from the controller RNC1 to a packet-switched media gateway (PS-MG). These communications may be terminated at the SGSN server 1 or the PS-MG, or they may be forwarded to the GGSN. The SGSN server 1 and the PS-MG may also originate messages to the GGSN. As can be appreciated, a reciprocal path from the GGSN to the MS, via SGSN server 1 or the PS-MG, may also be available. It will also be appreciated that the signal paths 601a, 601b indicate that various nodes are capable of communicating and do not signify any specific message(s).

One way to initiate a change of MC is for the controller RNC 1 to initiate a Serving Radio Network Subsystem (SRNS) Relocation procedure by sending a "Relocation Required" message to SGSN server 1. These procedures and messages are described in the 3GPP TS 23.060 specification cited above, and occur in response to movement by the MS.

Figure 1:
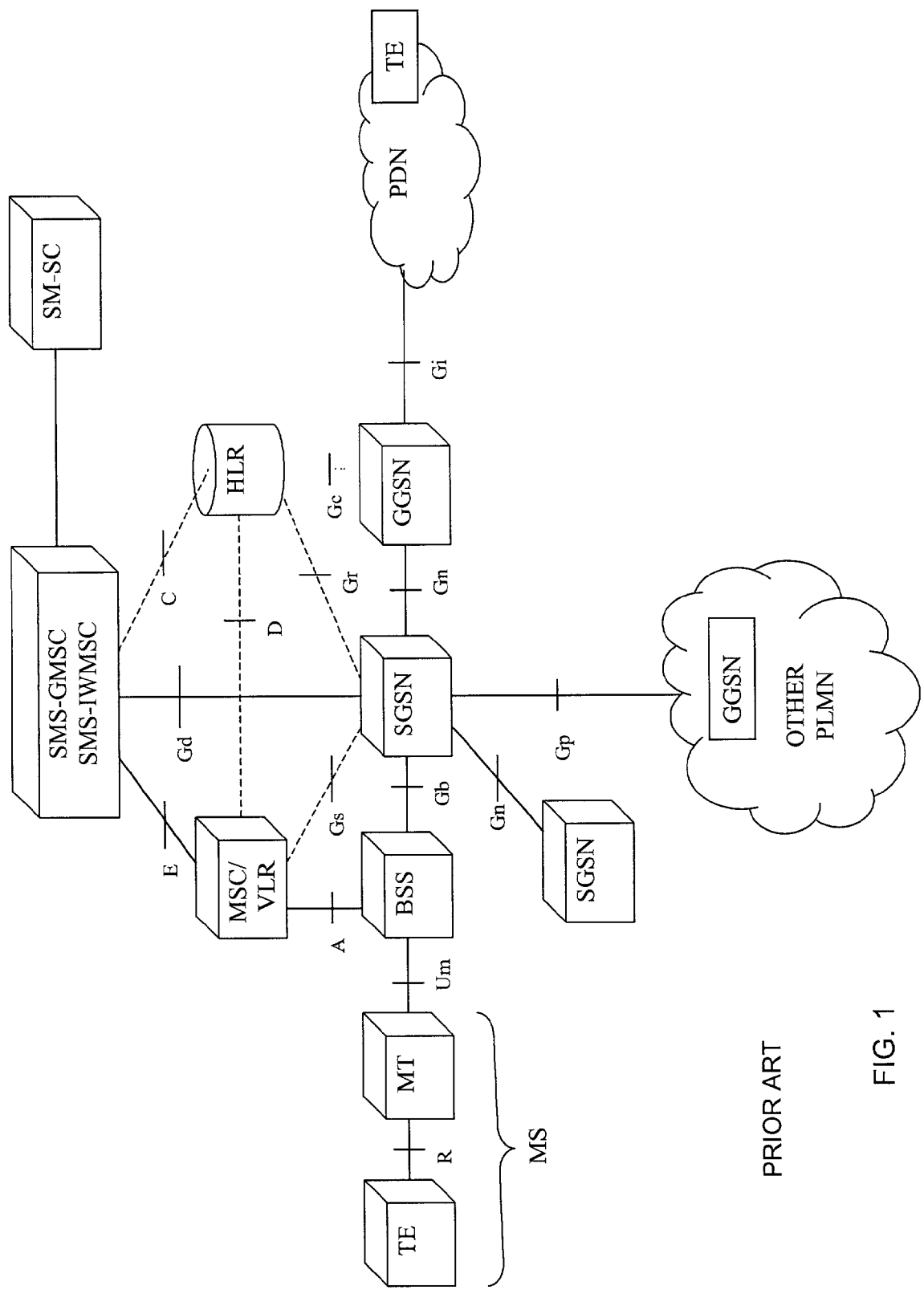
FIG. 1 depicts a combined packet-switched and circuit-switched communication network.
Figure 2:
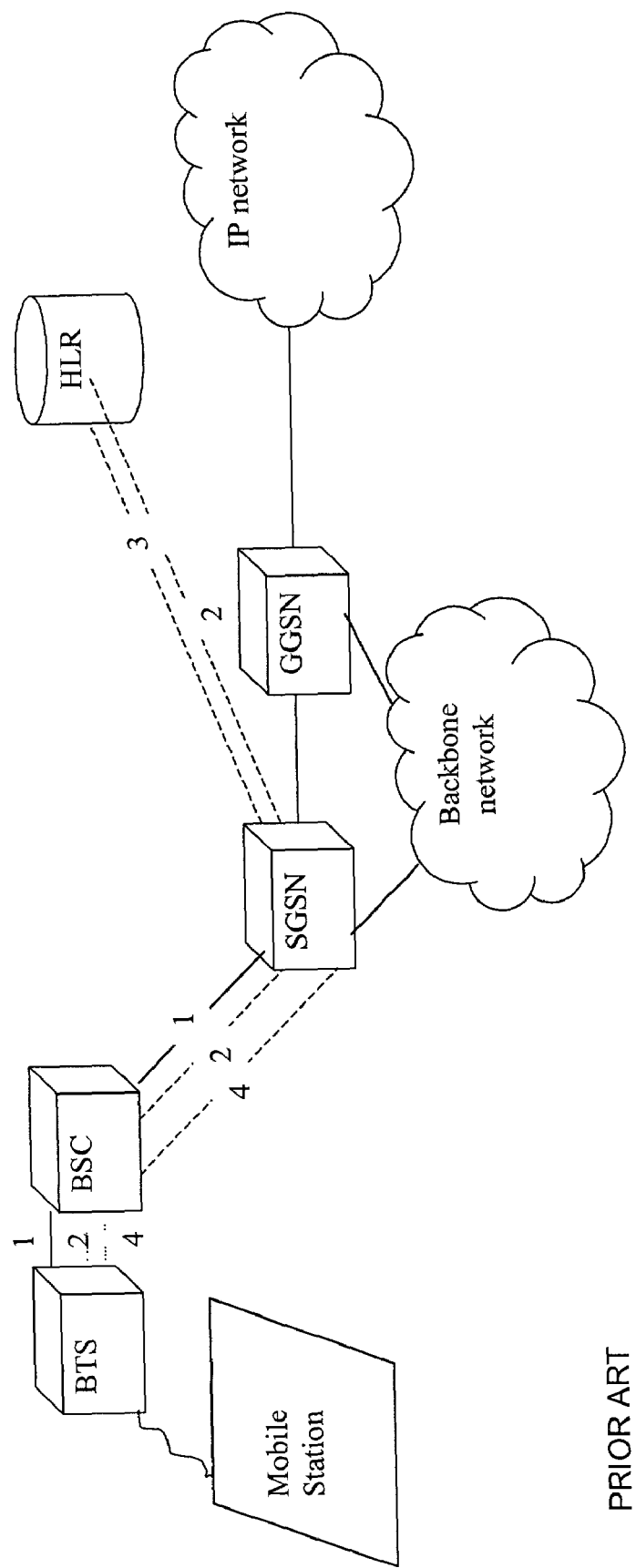
FIG. 2 depicts a simplified GPRS attach in a packet-switched network.
Figure 3:
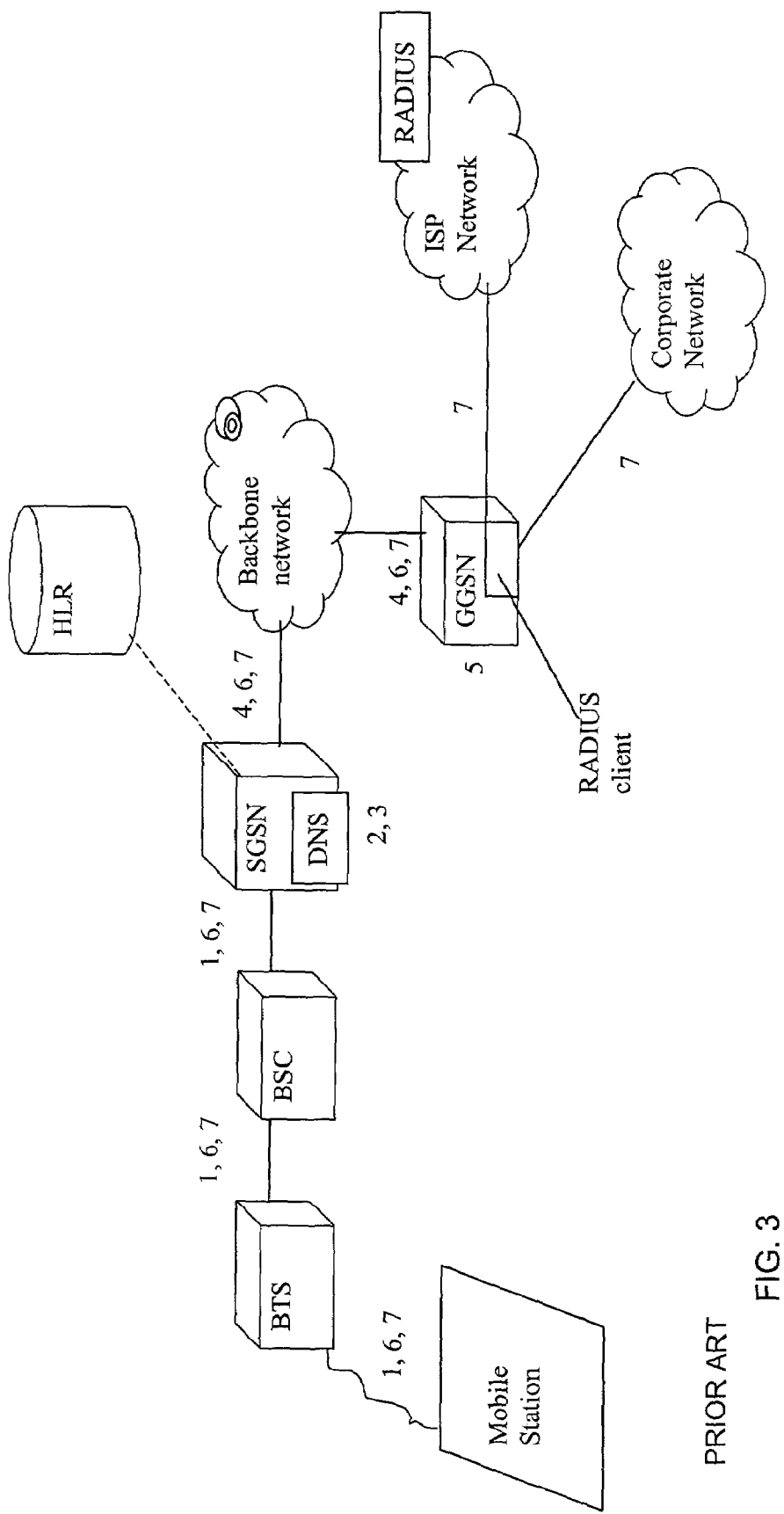
FIG. 3 depicts a simplified PDP context activation in a packet-switched network.
Figure 4:
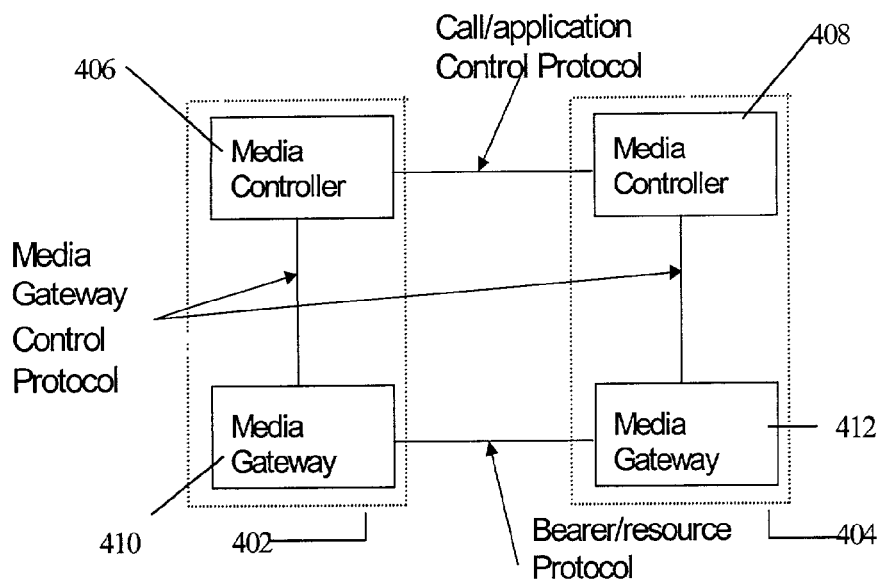
FIG. 4 depicts a network architecture in which nodes are split into control-plane and user-plane entities.
Figure 5:
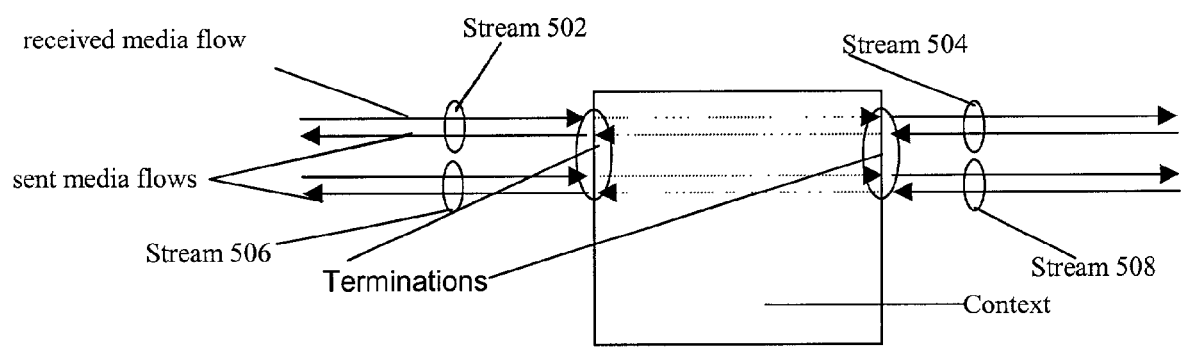
FIG. 5 depicts a conceptual organization of media gateway control protocol concepts.

The SGSN server 1 will typically already have received the set of parameters that identifies the call or session in the PS-MG in an "Add Response" message or a "Modify Response" message from the PS-MG when the SGSN server 1 ordered the call or session to be set up in the PS-MG. The setup of the call or session is done by, for example, a PDP context activation, which is generally depicted in FIG. 3. Thus, the set of parameters is typically stored in the SGSN server 1 before the change of SGSN server is imminent. As noted above, the set of parameters can alternatively be received in the SGSN server 1 from the PS-MG by the SGSN server 1's auditing the PS-MG when the SGSN server 1 is informed that a change in SGSN server is imminent, e.g., by receiving the "Relocation Required" message from the RNC 1 that includes parameters that identify the PS-MG and the call or session of the MS. This is indicated in FIG. 6 by the signal path 602.

The SGSN server 1 then sends a message to the new SGSN, SGSN server 2, that contains the parameters identifying the PS-MG and the call or session of the MS (signal path 603). For example, SGSN server 1 can send SGSN server 2 a "Forward Relocation Request" message that contains the information. As can be found from the SRNS Relocation procedure described in 3GPP TS 23.060, the Forward Relocation Request message follows the Relocation Required message.

Once SGSN server 2 receives the message and parameters from SGSN server 1, SGSN server 2 determines whether it can control the PS-MG by recognizing the address or identifier of the PS-MG. If SGSN server 2 can control the PS-MG, then SGSN server 2 informs the PS-MG that there has been a change of control node, but that the PS-MG should keep the resources and the identifiers used by SGSN server 1 to serve the MS (signal path 604). For example, SGSN server 2 can send the PS-MG this information in an "Add Request" message or a "Modify Request" message.

Once SGSN server 2 has established control of the PS-MG and the rest of the SRNS Relocation procedure has been performed, control-plane and user-plane signaling between the MS and the GGSN resumes. Signal path 605*a* indicates the normal control-plane message flow between the MS and the GGSN, and signal path 605*b* indicates the normal user-plane message flow between the MS and the GGSN. Typically, the MS communicates with a new controller RNC2 (due to movement of the MS) through a Node B (not shown). The controller RNC2 receives user-plane messages and control-plane messages from the MS and sends control-plane messages to SGSN server 2 and user-plane messages to the PS-MG. These communications may be terminated at the SGSN server 2 or PS-MG, or forwarded to the GGSN. The SGSN server 2 and the PS-MG may also originate messages to the GGSN. As can be appreciated, a reciprocal path from the GGSN to the MS, via SGSN server 2 or the PS-MG, may also be available. Furthermore, it will be appreciated that the signal paths 605*a*, 605*b* indicate that various nodes are capable of communicating and do not signify any specific message(s).

One of the advantages of Applicants' invention is that the same MG (such as the PS-MG) and the same call or session within the MG can be kept when there is a change of MC (such as SGSN server 1 and SGSN server 2) due for example to movement of the remote terminal that is in communication with the MG. Other scenarios where it might be useful to keep the MG but change the MC are when several MCs are placed in a pool, all covering the same geographical area, and maintenance work or a software upgrade should be performed on the MC in which a call or session is established or one or more MSs should be moved from one MC to another MC due to unbalanced load between the MCs. Thus, user-plane traffic is not interrupted to the same extent. As a result, some of the neighboring nodes do not have to be updated with new identities or references for the MG, and the MG itself would not require updated parameters.

It is currently believed that the methods described above are not limited to the H.248/MEGACO protocol but can be used for other Media Gateway Control protocols in a GPRS system, provided these other protocols use concepts that are suitably similar to the concepts used in the H.248/MEGACO protocol. In addition, Applicants' concept mapping should apply both for GPRS/UMTS and GPRS/GSM networks having one or more nodes, e.g., GSNs, split into Media Controllers and Media Gateways.

Applicants' invention is described above in connection with embodiments that are intended to be illustrative, not restrictive. It is expected that those of ordinary skill in this art will modify these embodiments. The scope of Applicants' invention is defined by the following claims, and all modifications that fall within the scopes of these claims are intended to be included therein.

What is claimed is:

1. A method in a communication system of transferring control of a user-plane entity from a first control-plane entity to a second control-plane entity, comprising the steps of:

sending, by the user-plane entity to the first control-plane entity, a set of identifying parameters;

sending, by the first control-plane entity to the second control-plane entity, the set of identifying parameters;

determining, in the second control-plane entity, whether the user-plane entity can be controlled by the second control-plane entity; and if the user-plane entity can be controlled by the second control-plane entity, then sending, by the second control-plane entity to the user-plane entity, an indication that a change in control-plane entities has occurred and that at least some resources of the user-plane entity that were controlled by the first control-plane entity are to be controlled by the second control-plane entity.

2. The method of claim 1, wherein the first control-plane entity sends the set of identifying parameters to the second control-plane entity based on a location of a remote terminal in communication with the user-plane entity.

3. The method of claim 1, wherein the first control-plane entity sends the set of identifying parameters to the second control-plane entity based on a status of the first control-plane entity.

4. The method of claim 1, wherein the first control-plane entity sends the set of identifying parameters to the second control-plane entity based on relative loads in the first and second control-plane entities.

5. The method of claim 1, wherein the communication system is a General Packet Radio Service network and the set of identifying parameters are sent in a Forward Relocation Request message from the first control-plane entity to the second control-plane entity.

6. The method of claim 1, wherein the step of sending, by the user-plane entity to the first control-plane entity, the set of identifying parameters is executed in response to receiving, by the user-plane entity, the indication that the change of control-plane entity is required.

7. The method of claim 6, wherein the indication that the change of control-plane entity is required is sent based on a location of a remote terminal in communication with the user-plane entity.

* * * * *